(12) United States Patent
Podlipec et al.

(10) Patent No.: US 6,315,507 B1
(45) Date of Patent: Nov. 13, 2001

(54) DRILL OR MILLING HEAD

(75) Inventors: Milan Podlipec; Bostjan Podlipec, both of Vrhnika; Janez Zepic, Ljubljana, all of (SI)

(73) Assignees: PMV d.o.o., Trzic (SI); LPKF Laser & Electronics AG, Garbsen (DE)

( * ) Notice: Subject to any disclaimer, the term of this patent is extended or adjusted under 35 U.S.C. 154(b) by 0 days.

(21) Appl. No.: 09/601,239

(22) PCT Filed: Jan. 27, 1999

(86) PCT No.: PCT/DE99/00209

§ 371 Date: Sep. 8, 2000

§ 102(e) Date: Sep. 8, 2000

(87) PCT Pub. No.: WO99/38647

PCT Pub. Date: Aug. 5, 1999

(30) Foreign Application Priority Data

Jan. 29, 1998 (DE) .............................................. 198 03 274

(51) Int. Cl.[7] .................................. B23C 9/00; B23B 5/22
(52) U.S. Cl. .............................. 409/234; 279/50; 279/74; 279/134; 408/240
(58) Field of Search .................................... 409/232, 234; 408/238, 239 R, 239 A, 240; 279/50, 57, 74, 134, 135, 142; 475/196

(56) References Cited

U.S. PATENT DOCUMENTS

| | | | |
|---|---|---|---|
| 3,227,005 | * | 1/1966 | Johnson ................................ 475/196 |
| 3,244,026 | * | 4/1966 | Dekay ................................ 475/290 X |
| 4,296,648 | * | 10/1981 | Okano et al. ........................ 475/159 |
| 6,244,798 | * | 6/2001 | Podlipec ............................... 409/234 |

FOREIGN PATENT DOCUMENTS

| | | | | |
|---|---|---|---|---|
| 3434699 | * | 4/1986 | (DE) . | |
| 118824 | * | 9/1984 | (EP) . | |
| 276085 | * | 7/1988 | (EP) . | |
| 349268 | * | 9/1990 | (EP) . | |
| 1163949 | * | 10/1958 | (FR) | ...................................... 409/234 |
| 115848 | * | 5/1918 | (GB) . | |
| 361082063 | * | 4/1986 | (JP) | ...................................... 475/196 |

* cited by examiner

Primary Examiner—William Briggs
(74) Attorney, Agent, or Firm—Crowell & Moring LLP

(57) ABSTRACT

A drilling or milling head, especially for printed circuit board milling machines and/or engraving machines, having a collet chuck (11) which can be actuated by a rapid change mechanism and which is driven by a transmission. The collet chuck is opened by an axial displacement relative to a clamping sleeve (50), with the force necessary for the displacement being transmitted via a friction clutch. The transmission includes a ball bearing (9) whose balls (12) are moved around a common axis in a concentric manner by a driving part (6) fixed on a motor drive shaft (5). In addition, the balls are mounted between two bearing surfaces (13, 14) which are aligned in a concentric manner with regard to the axis and which have a circular cross-section. The balls are at least partially engaged with the bearing surfaces in a positive manner. The bearing surfaces, one of which can rotate and the other of which is fixed, are axially aligned and symmetrical to one another, and they are concavely curved with the maximum distance between the convex surfaces being equal to the ball diameter. The balls are subjected to an axial force. The drilling or milling head of the invention makes it possible to drive the collet chuck at a different speed than that of the motor.

15 Claims, 3 Drawing Sheets

DRILL OR MILLING HEAD

BACKGROUND OF THE INVENTION

This invention relates to a drilling or milling head with a collet chuck operated by a quick-change mechanism and a drive shaft connected to a motor, the collet chuck being opened by axial displacement with respect to a clamping sleeve and the force necessary therefor being transferred through a friction clutch, and having a transmission for driving the collet chuck. In particular, this drill or milling head is suitable for machines which serve for the production of fine structures such as circuit-board milling machines and engraving machines.

In the as yet unpublished patent application Ser. No. 197 48 735.1 a drilling or milling head of this kind is described. In this drilling or milling head a drive shaft of the motor is connected by a coupling to a drive shaft of the collet chuck. Thus, the rotatory speed of the chucked tool is always equal to the motor speed.

SUMMARY OF THE INVENTION

It is therefore the object of the invention to provide a drilling or milling head of this kind in which the rotation of the motor drive shaft can be transferred with a gear ratio to the drive shaft of the drilling or milling head by means of a transmission based on simple means.

This object is achieved by the invention as described and claimed hereinafter. In the drilling or milling head according to the invention, the driving part of the transmission is a ball bearing whose balls are driven concentrically about a common axis by means of a driving part fastened on a drive shaft of the motor. The balls are mounted between two bearing surfaces of circular cross section aligned concentrically with the axis, and engaged in an at least partially force-transmitting manner with them. One of the bearing surfaces is rotatable about the axis while the other bearing surface remains fixed. Also, the bearing surfaces are aligned substantially parallel to the axis and concavely curved in the axial direction symmetrically to one another, the maximum distance of the curves from one another being approximately equal to the diameter of the balls. A force is applied axially to the balls by the driving part.

The transmission is based on the principle that the balls move simultaneously relative to two concentric circumferential surfaces serving as bearing surfaces, which are circular in cross section and have different radiuses. The result is different angular velocities of the motor drive shaft and the driven bearing surface, corresponding to the ratio of the radiuses of the bearing surfaces.

Thus a drilling or milling head is provided with a transmission that is space-saving and subjected hardly at all to wear. Since it is based on simple means, the transmission can also be manufactured at low cost. Since the bearing surfaces are aligned substantially parallel to the axis and concavely curved in the axial direction, and indeed such that the curvatures are symmetrical with one another, i.e., with respect to the axis passing through the balls about which the balls rotate, and furthermore since the balls are subjected to a force by the driving part, the balls are urged against an area of the curves in which the distance of the curves from one another is less than the diameter of the balls. In this manner a force-transmitting engagement of the balls with the bearing surfaces is achieved, resulting in a simple form of a slipping coupling.

Inasmuch as the bearing surfaces are concavely curved, the axial travel of the driving part is especially short—shorter, for example, than in the case of the surfaces tapering in the axial direction. Due to the curvature of the bearing surfaces the balls come very quickly into engagement with the bearing surfaces.

The driving part can be biased by a spring which is fastened on the motor drive shaft between a motor housing and the driving part. The spring absorbs the reaction force upon engagement and simultaneously offers protection against overload due to excessive heating of the balls and the races. The spring force is to be adjusted accordingly when the transmission is assembled.

The transmission can be used both for increasing speed and for reducing speed. To achieve a speed increase, the bearing surface having the greater radius is fixed. In this manner the part that forms the bearing surface having the smaller radius is caused to rotate. This part can directly be a section of the drive shaft of the drilling and milling head, or it can also be joined to this drive shaft through a coupling.

The bearing surfaces can be formed by a bearing inner ring or a bearing outer ring. The bearing outer ring, if it is fixed, can be inserted in a housing of the transmission. The bearing inner ring can be pressed on the driven part.

Preferably the driving part fastened on the motor drive shaft is a toothed flange whose teeth are engaged between the balls. Provision can be made for pressing seats in the axial direction into the toothed flange for the balls of the ball bearing. The toothed flange is preferably made from wear-resistant material. Sintered bronze, preferably impregnated with oil, is especially suited to the purpose.

The friction clutch of the drilling or milling head preferably is comprised of a part that can be moved axially and relative to the drive shaft of the drilling or milling head and a part that is axially displaceable and affixed to the drive shaft of the drilling or milling head, the two parts having faces which conform to one another which come in contact when the quick change mechanism is operated. Provision is made for the two parts each to be supported on the tool side against the force of a spring. This assures that in a state of rest, the two parts will be spaced a distance from one another, and in case the part of the drilling or milling head affixed to the drive shaft rotates only friction will occur between the surfaces, which does not result in damage to the drilling or milling head.

According to a preferred embodiment of the drilling or milling head, the part that can be moved relative to the drive shaft of the drilling or milling head is cylindrical and is arranged concentrically with this drive shaft, and has on the end toward the motor an annular shoulder. The part of the drilling or milling head that is affixed to the drive shaft is a sleeve with a circumferential flange. The conforming surfaces are formed on the annular shoulder and on the circumferential flange planar and perpendicular to the shaft.

Since the force necessary for the axial shifting of the collet chuck is transmitted by a friction clutch, it is impossible for an accidentally still rotating collet chuck when opened to come into locking engagement with a non-rotating part. The axial displacement force is instead transferred in a positive manner through the friction clutch to the collet chuck, or to the drive shaft to which the collet chuck is attached.

The quick change mechanism can be operated manually through a hand actuator. Provision can also be made for the hand actuator to be locked in the position in which the collet chuck is open. This has the advantage that the operator has both hands free to manipulate the drilling or milling tool.

The hand actuator can be, for example, a lever which has a handle section and a functional section disposed within a housing of the drilling or milling head. It is anticipated that in the rest position this functional section of the lever will form an inclined angle to a horizontal plane and in the actuated position it will assume a right angle to the drive shaft of the drilling or milling head, and furthermore lies against an immovable surface of the drilling or milling head and, on the tool side, against the part that is movable relative to the drive shaft. When in the actuated position the functional section of the lever has a greater maximum length in the axial direction than in the rest position. Thus, moving the lever from its rest position to its active position causes the part of the friction coupling that can move relative to the drive shaft to be displaced toward the tool end of the drilling or milling head, and at the same time, as will be described below, the drive shaft and collet chuck are also displaced so as to cause the collet chuck to open.

The functional section of the lever is preferably annular and arranged concentric to the drive shaft. If the outside diameter of the functional section is equal to the inside diameter of the housing and the outside of the functional section is convexly curved, to outside of the functional section will be in contact with the housing of the drilling or milling head in any position along its entire circumference, except for an area in which the handle section is attached. This assures that the lever only changes its angular position relative to the drive shaft and optionally can be rotated slightly about the axis of the drilling or milling head to lock it in position, but beyond that it is fixed. The handle extends through an opening in the housing.

The maximum extension of the functional section in the axial direction, which is variable according to its position, is preferably achieved in that on the functional section of the lever, cams are disposed on the tool side on both sides of the drive shaft in the plane perpendicular to the longitudinal axis of the lever in which the drive shaft lies when the lever is in the actuated position, and an additional cam is disposed on the motor side opposite the handle part of the lever. The two cams on the tool side and the cam on the motor side are thus offset by 90°. Therefore the functional section, when in the horizontal position, i.e., in the actuated position, has a greater axial length than in the inclined or rest position.

When the lever is moved from its rest position to its actuated position, the two cams on the tool side press against an abutment surface of the part that is movable in the axial direction relative to the drive shaft. This latter part then moves toward the collar affixed to the drive shaft. Thus, by actuating the lever, the drive shaft is shifted toward the tool end of the drilling or milling head. With the drive shaft, the collet chuck is also displaced relative to the clamping sleeve. This opens the chuck whose gripping jaws lie in contact in the end section of the clamping sleeve with an inner surface of the clamping sleeve which conically converges in the axial direction toward the motor.

The quick change mechanism can also be operated pneumatically.

In order to permit an easy separation of the motor and drilling or milling head, the transmission and the drive shaft of the drilling or milling head can be connected together with a coupling. This coupling is preferably a resilient coupling so as to enable vibrations in the axial direction to be absorbed.

If need be, the drilling or milling head can be connected very easily by the coupling to different motors. The result is a modular construction of a drilling or milling head which is a completely independent unit with the mechanism for a quick and reliable tool change.

It can also be arranged according to the invention for two or more operatively connected transmissions of the kind described to be arranged one after the other. The driven part of the first drive then engages between the balls of the second transmission. In this manner, for example, the rotatory speed of the drive shaft of the drilling or milling head can be further increased.

BRIEF DESCRIPTION OF THE DRAWINGS

The drilling or milling head according to the invention will be further explained below with respect to a working embodiment, reference being made to the drawings, in which.

DETAILED DESCRIPTION OF PREFERRED EMBODIMENTS

Figure 1:
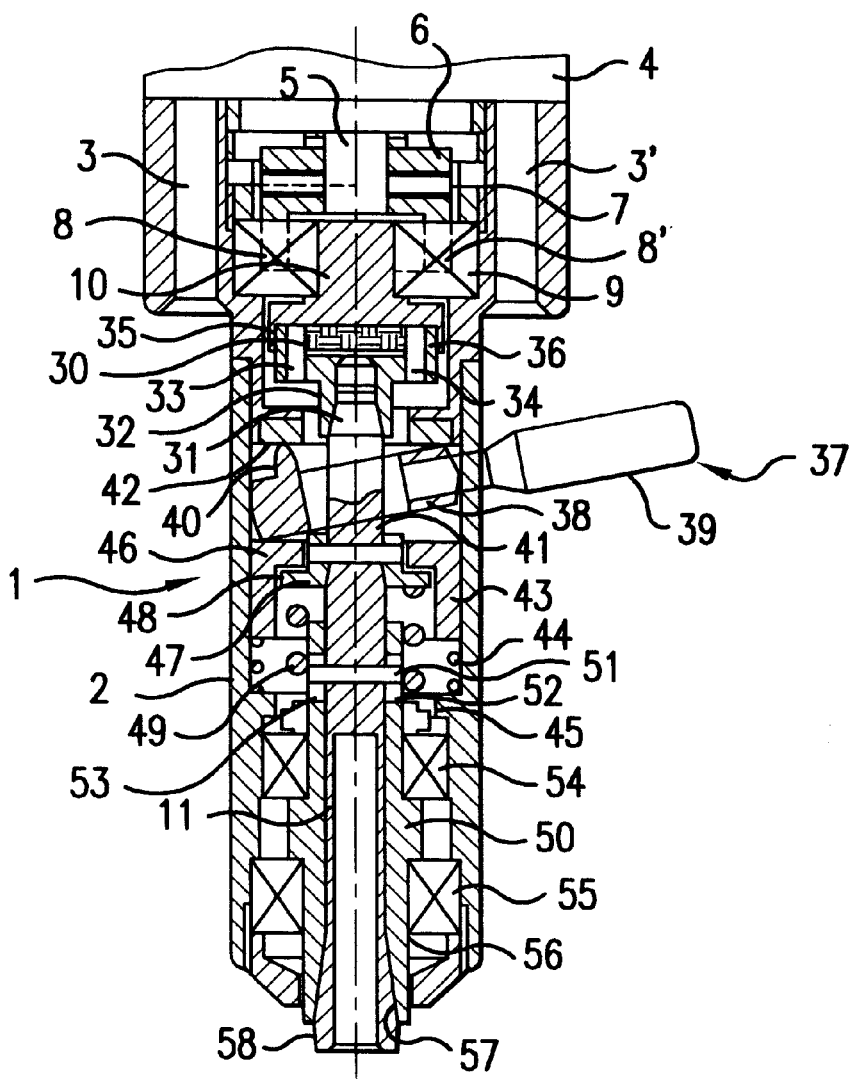
FIG. 1 is a sectional view of a drilling or milling head.

The drilling or milling head 1 shown in FIG. 1 has a housing 2 which is connected by two screws 3 and 3' with a motor 4, which is indicated only schematically. The motor 4 has a drive shaft 5.

A toothed flange 6 made of oil-impregnated sintered bronze is fastened by means of a pin 7 on the drive shaft 5. The teeth 8 and 8' of the toothed flange 6 extend into a ball bearing 9. The ball bearing 9 is arranged between the housing 2 of the drilling or milling head 1 and the driven part 10 of the driving mechanism. The driven part 10 drives a collet chuck 11 through a drive shaft 31 of the drilling or milling head 1. Before this drive mechanism is described, first the transmission will be explained in detail.

Figure 2:
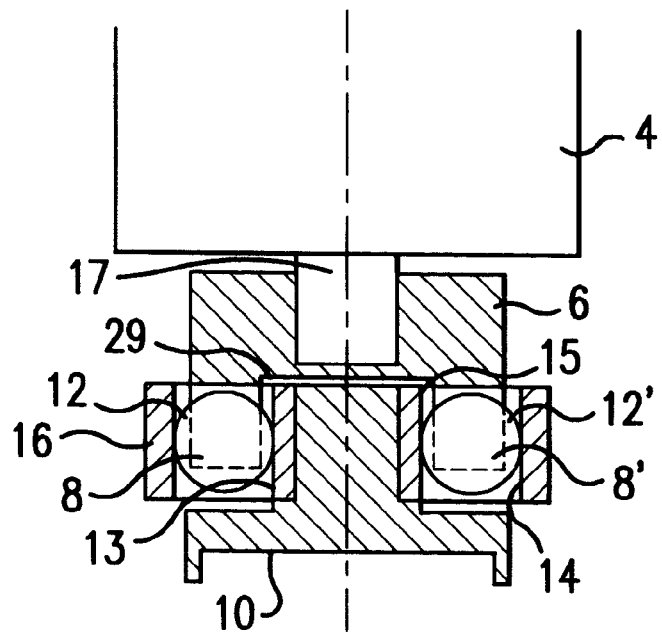
FIG. 2 is a detail view of the transmission of the drilling or milling head of FIG. 1.

As shown in detail in FIG. 2, the balls 12 and 12' of the ball bearing 9 are held between an inner bearing surface 13 and an outer bearing surface 14. The inner bearing surface 13 is formed by a inner bearing ring 15, and the outer bearing surface 14 by an outer bearing ring 16. The inner bearing ring is pressed onto the driven part 10 of the driving mechanism. The outer bearing ring 16 is inserted in the housing 2 of the drilling or milling head 1.

Between the toothed flange 6 and the motor 4 a spring 17 is arranged which exerts an axial force against the toothed flange 6.

Figure 3:
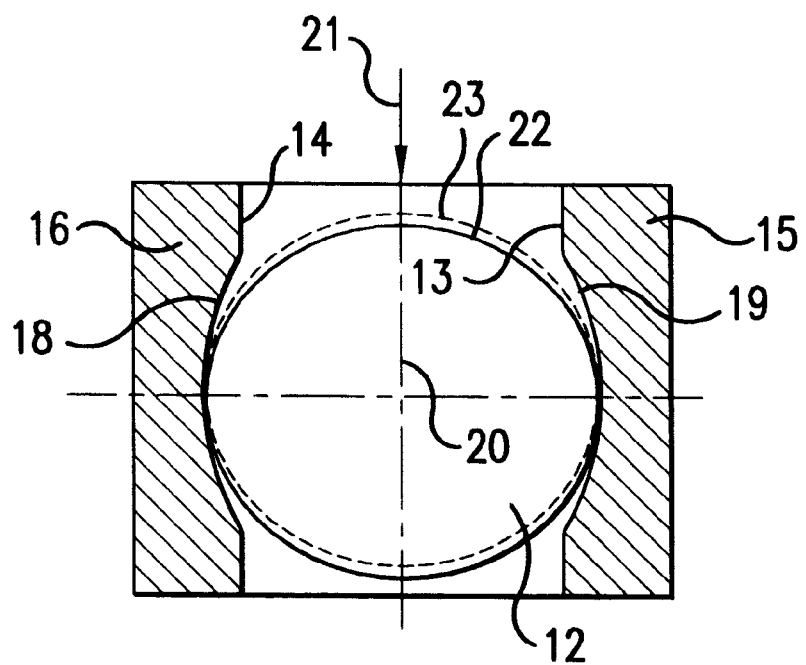
FIG. 3 is an enlarged view of the mounting of one of the balls of the ball bearing.

The inner bearing surface 13 and the outer bearing surface 14 are shown enlarged in FIG. 3 together with one ball 12 of the ball bearing 9. The two bearing surfaces 13 and 14 have each a concave curvature 18 and 19, respectively. The curves 18 and 19 extend axially over a length that is slightly greater than the diameter of the ball 12. The two curves 18 and 19 are configured symmetrically to one another with respect to the axis 20 passing through the ball 12. The maximum distance between the curves 18 and 19 is equal to the diameter of the ball 12. This distance is between the centers of the curves 18 and 19.

An axial force which is indicated by the arrow 21 is exerted on the ball 12 by the toothed flange 6 (not shown in FIG. 3). Depending on the exerted force 21, the ball 12 assumes different axially displaced positions 22 or 23, respectively, which are represented in FIG. 3 by a solid line 22 and a broken line 23, respectively.

Figure 4:
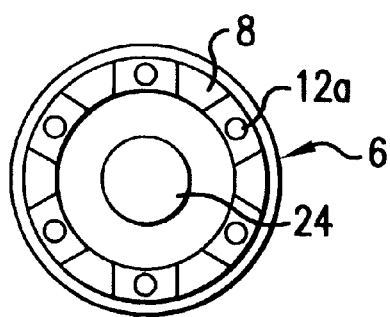
FIG. 4 is a plan view of a toothed flange.
Figure 5:
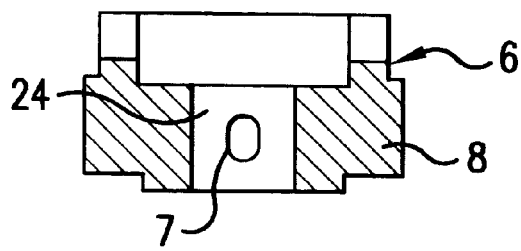
FIG. 5 is a sectional view of the toothed flange of FIG. 4.
Figure 6:
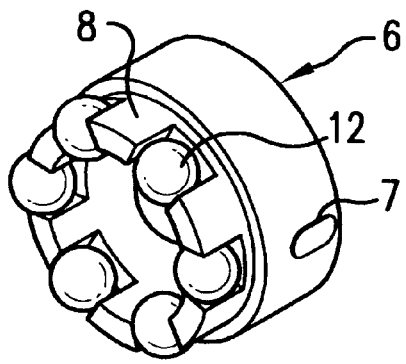
FIG. 6 is a perspective view of the toothed flange of FIGS. 4 and 5.

In FIGS. 4, 5 and 6 the structure of the toothed flange 6 is shown in detail. The toothed flange 6 has a bore 24 in which the drive shaft 6 of the motor is engaged. The toothed flange 6 is fastened on the drive shaft 5 by the pin 7 that is perpendicular to the drive shaft 5. The toothed flange 6 has a circular cross section, with six teeth 8 arranged on its circumference. Between the teeth 8 are seats 12a for the balls 12. The seats 12a are pressed axially into toothed flange 6 and have a depth of about 0.2 mm and a diameter of about 1.5 mm.

Figure 7:
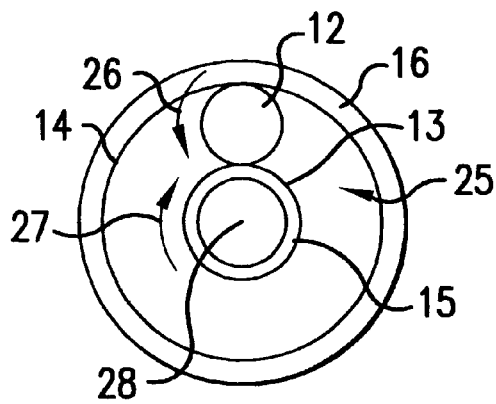
FIG. 7 shows the principle of increasing the speed by means of the transmission.

In FIG. 7 the principle of operation of the driving mechanism is further explained, in particular for the case of a rotary speed increase. The ball 12 is rotated by the toothed flange 6 (not shown in FIG. 6) in the direction of arrow 25. The ball 12 thus runs on the outer bearing surface 14 which is formed by the fixed outer bearing race 16. The inner bearing race 15, in contrast, is rotatably mounted. Due to the self-rotation of the ball 12 indicated by the arrow 26 and a driving engagement of the ball 12 with the bearing's inner ring 15, the inner ring 15 rotates in the direction of the arrow 27. The angular velocity of the rotation of ball 12 on the axis 28 is equal to the angular velocity of the toothed flange 6 and drive shaft 5 of the motor 4. The angular velocity of the inner bearing ring 15, however, is greater, namely by a factor that is equal to the ratio of the radius of the outer bearing ring 16 to the radius of the inner bearing ring 15.

The driving engagement of ball 12 with bearing surfaces 13 and 14 is brought about by the axial force 21 which is exerted by the motor 4 and the spring 17 on the toothed flange 6, which in turn presses against the balls 12 of the ball bearing 9. Thus the air gap 29 (see FIG. 2) is accordingly reduced. Due to the driving engagement the balls 12 rotate, as a rule accompanied by the occurrence of an initial slippage, both about their own axes and about the axis of the driven part 10 of the driving mechanism. The inner bearing race 15 is thus also rotated, and since it is affixed to the driven part 10 of the transmission, the driven part 10 also is rotated.

Because of the ball seat 12a no readjustment of the spring 17 is necessary during operation.

With the driving mechanism it is thus possible to achieve a speed increase in a simple manner. It is also possible, however, to use the driving mechanism in a reverse manner for a reduction of speed. In such a case the inner bearing race 15 must be fixed while the outer bearing race 16 must be mounted for rotation.

The drive mechanism for the drilling or milling head 1 is described hereinafter, and also a mechanism for a rapid and safe tool change.

The driven part 10 of the driving mechanism contains an elastic coupling disk 30. The coupling disk 30 is opposite a plate-like attachment 32 which is fastened on the drive shaft 31 of the drilling or milling head 1, and which forms together with the driven part 10 of the transmission and two connecting pins 33 and 34 a coupling between the driven part 10 of the transmission and the drive shaft 31 of the drilling or milling head 1. The connecting pins 33 and 34 are fixed in the attachment 32 on the drive shaft 31 of the drilling or milling head 1 and engage in recesses in the coupling disk 30.

The drilling or milling head furthermore has a lever 37 with a functional section 38 disposed within the housing 2 and a handle 38 projecting out of the housing 2. The functional section 38 is annular and concentric with the drive shaft 31 of the drilling and milling head 1. The functional section 38 has such a diameter and is convexly curved on the outer surface such that, in every position, except for a range in which the handle section 39 is attached, it is in contact with the housing 2 of the drilling and milling head 1. On the side of the functional section 38 facing the motor 4 a cam 40 is disposed. On the opposite side of the functional section 38 two cams 41 are disposed, only one of which is shown. These two cams 41 lie in the plane rotated 90° around the drive shaft 31 from the section plane. On the motor side the function section 38 is in contact with a fixed ring 42, and on the tool side it is in contact with a cylindrical part 43 which is movable in the axial direction and which in turn is supported on the tool side by a spring 44 against a projection 45 of the housing 2. On the end toward the motor 4 this part 43 has an annular shoulder 46 which is at a right angle to the wall of part 43.

A collar 47 with a circumferential flange 48 is affixed to the drive shaft 31. The flange 48 is aligned parallel with the shoulder 46 and of such dimensions that, upon a movement of part 43 toward the tool end of the drilling and milling head 1, the confronting planar surfaces of the shoulder 46 and flange 48 come in contact. On the tool side, the collar 47 is supported by a spring 49 against a clamping sleeve 50. The clamping sleeve 50 surrounds a section of the drive shaft 31 and, except for a short end portion, it surrounds the entire collet chuck 11 with which the drive shaft 31 merges. A pin 51 passing transversely through the drive shaft 31 extends on both sides of the drive shaft 31 into elongated slots 52 and 53 each running parallel to the drive shaft 31 in the clamping sleeve 50.

The clamping sleeve 50 is journaled on two bearings 54 and 55 and secured by a snap ring 56 against axial displacement. The clamping sleeve 50 has in its end section an interior surface 57 which converges conically in the axial direction toward the motor 4. The gripping jaws 58 of the collet chuck 11 are in contact with this interior surface 57 when the collet chuck 11 is closed.

Figure 8:
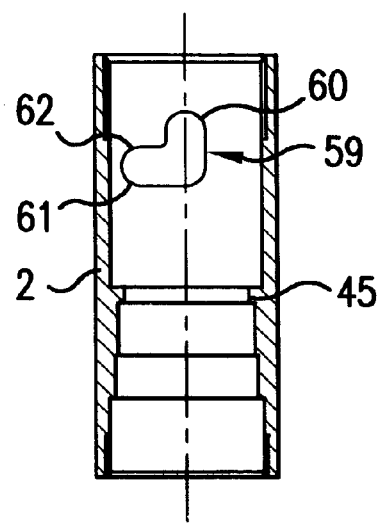
FIG. 8 is a sectional view of the housing of the drilling or milling head, which has a locking device for a handle of the quick-change mechanism.

As shown in FIG. 8, in this embodiment provision is made for locking the lever 37 in its actuated position, i.e., in the open state of the chuck 11. For this purpose an opening 59 of substantially right-angle shape is provided in the housing 2 for the lever 37, one leg 60 thereof being aligned axially. The second leg 61, which at its outer end has a recess 62 extending in the same direction as leg 60, forms a catch for the lever 37.

When a tool (not shown) is clamped in the drilling and milling head 1, the lever 37 is in its rest position shown in FIG. 1. It is held in this position, in which the functional section 38 of lever 37 has its least axial elongation, by the force of spring 44 transmitted through cylindrical portion 43. If the lever 37 is moved to its horizontal position, the axial elongation of functional section 38 increases so that the moving part 43 is shifted toward the tool end of the drilling and milling head 1. In this way the two confronting planar faces of the shoulder 46 and flange 48 are brought into contact, so that the collar 47 is also displaced. Since the collar 47 is affixed to the drive shaft 31, the drive shaft 31 and the chuck 11, which directly adjoins the drive shaft 31, move toward the tool end of the drilling and milling head 1. As a result of the displacement of the collet chuck 11 with respect to the clamping sleeve 50 which is fixed in the axial direction, the gripping engagement of the conical inner surface 57, the clamping sleeve 50 and the gripping jaws 58 of the collet chuck 11 is relaxed, so that the tool held by the gripping jaws 58 is released.

The pin 51 and the elongated slots 52 and 53 constitute an interlock by means of which the clamping sleeve 50 always will rotate with the drive shaft 31, so that no friction occurs between these two parts. The slots 52 and 53 assure that the drive shaft 31 can thereby shift axially with respect to the clamping sleeve 50.

When lever 37 is moved to its actuating position, the connecting pins 33 and 34 of the coupling between the driven part 10 of the transmission and the drive shaft 31 also move toward the tool end of the drilling and milling head 1. However, they do not pass entirely out of their recesses 35 and 36, so that disengagement does not occur.

To lock the lever 37, it is rotated in its actuated position slightly around the axis of the drilling and milling head 1, so that it is received and held in the recess 62.

If the motor 4 is accidentally left on before the lever 37 is operated, nevertheless no damage can be done to the drilling and milling head 1 and there is no danger of injuring persons, since the contact surfaces of the cylindrical part 43 and the collar 47 are designed to withstand the resulting friction heat and the collet chuck 11 cannot come loose from the drive shaft 31.

What is claimed is:

1. A drilling or milling head comprising:
    a housing;
    a rotatable collet chuck which is opened by axial displacement with respect to a clamping sleeve mounted within said housing;
    a drive shaft operatively connected to a motor for rotatably driving the collet chuck;
    a transmission interposed between the motor and said drive shaft for stepping up or stepping down the rotational speed of said collet chuck relative to said motor; and
    a quick change mechanism for opening said collet chuck, said quick change mechanism including a friction clutch through which force required to axially displace and open said collet chuck is transferred to said collet chuck;
    wherein said transmission comprises outer and inner bearing rings disposed concentrically around an axis of said drilling or milling head and having respective opposed bearing surfaces which are concavely curved in the axial direction and which are symmetrical to each other, one of said outer and inner bearing rings being fixed relative to said housing and the other of said outer and inner bearing rings being mounted for rotation about said axis and coupled to said drive shaft, a plurality of balls disposed between the curved bearing faces of said outer and inner bearing rings, the maximum spacing of said curved bearing faces from each other being equal to the diameter of said balls, and a driving part rotated by the motor for driving said balls around said axis along the curved bearing surface of the fixed bearing ring, said driving part exerting an axial force against said balls to urge said balls into force-transmitting engagement with said bearing surfaces, whereby the rotationally mounted bearing ring and the drive shaft are caused to rotate.

2. A drilling or milling head according to claim 1, further comprising a spring arranged between the motor and the driving part for biasing the driving part against said balls.

3. A drilling or milling head according to claim 1, wherein the fixed bearing ring has a larger radius than the rotatably mounted bearing ring.

4. A drilling or milling head according to claim 1, wherein said bearing surfaces are formed, respectively, by an inner bearing race and an outer bearing race.

5. A drilling or milling head according to claim 4, wherein the outer bearing race is inserted in a housing of the drilling or milling head.

6. A drilling or milling head according to claim 4, wherein the inner bearing race is pressed onto a driven part coupled to said drive shaft.

7. A drilling or milling head according to claim 1, wherein said driving part comprises a toothed flange with teeth which extend between said balls.

8. A drilling or milling head according to claim 7, wherein said toothed flange is provided with axially recessed seats for said balls.

9. A drilling or milling head according to claim 1, wherein said driving part is made from oil-impregnated sintered bronze.

10. A drilling or milling head according to claim 1, wherein the friction clutch comprises an axially movable part movable axially and relative to the drive shaft of the drilling or milling head and an axially displaceable part affixed to the drive shaft, said movable part and said displaceable part each being supported by a respective spring and both having conforming surfaces which come in contact with each other when said quick release mechanism is actuated.

11. A drilling or milling head according to claim 10, wherein said movable part relative to the drive shaft is cylindrical and is disposed concentrically with the drive shaft and has an annular shoulder on one end toward the motor, and wherein said displaceable part affixed to the drive shaft comprises a collar with a circumferential flange, and said conforming surfaces are flat and extend perpendicular to the drive shaft.

12. A drilling or milling head according to claim 1, wherein the quick change mechanism is provided with an operating handle for operating the quick change mechanism.

13. A drilling or milling head according to claim 1, wherein said quick change mechanism is pneumatically operated.

14. A drilling or milling head according to claim 1, further comprising a resilient coupling disk for connecting the said drive shaft of the drilling or milling head to the motor such that the drilling or milling head and the quick change mechanism together form an independent unit.

15. A drilling or milling head according to claim 14, wherein said resilient coupling disk is arranged to selectively connect the drilling or milling head with different motors.

* * * * *